United States Patent [19]
Amitay et al.

[11] Patent Number: 5,684,801
[45] Date of Patent: Nov. 4, 1997

[54] PORTABLE WIRELESS LOCAL AREA NETWORK

[75] Inventors: Noach Amitay, Holmdel; Theodore Sizer, II, Little Silver, both of N.J.

[73] Assignee: Lucent Technologies, Murray Hill, N.J.

[21] Appl. No.: 366,540

[22] Filed: Dec. 30, 1994

[51] Int. Cl.⁶ .................................................. H04J 3/02
[52] U.S. Cl. ............................................ 370/447; 370/461
[58] Field of Search ..................... 370/50, 70, 95.1, 370/95.2, 95.3, 85.7, 85.2, 85.3, 85.6, 85.8, 91, 92, 93, 94.1, 94.2, 94.3, 60, 66, 60.1, 13.1, 75, 97, 106, 107, 108, 110.1, 100.1, 18, 69.1, 295, 302, 294, 313, 311, 315, 314, 320, 321, 324, 326, 329, 335, 343, 346-350, 402, 403, 418, 421, 425, 444-462, 475, 492, 501, 503, 908; 455/3.1, 3.2, 3.3, 4.2, 5.1, 11.1, 12.1, 13.1, 13.2, 13.4, 15, 16, 17, 20, 23, 33.1, 35.1, 37.1, 38.1, 38.2, 38.5, 53.1, 54.1; 375/211, 200, 202, 205, 206, 208, 209, 210, 212, 367; 340/825.5, 825.51, 825.52, 825.08, 825.03, 825.04; 379/4; 348/6, 7; 380/34, 43

[56] References Cited

U.S. PATENT DOCUMENTS 5,276,703  1/1994  Budin et al. ............................ 375/206
5,422,887  6/1995  Diepstraten et al. ................... 370/85.3

OTHER PUBLICATIONS

"Protocol for Fast Resource Assignment in Wireless PCS", M.J. Karol et al., *IEEE Transactions on Vehicular Tech.*, Aug. 1994, No. 3, pp. 727-732.

"Wireless Local Area Network Communications System", D. Budin et al., WO 93/14580, International Application Published Under PCT, 22 Jul. 1993.

"Distributed Switching and Control with Fast Resource Assignment/Handoff for Personal Communications Systems", IEEE Journal of Selected Areas in Communications vol. 11, No. 6, Aug.,1993 by Noach Amitay, pp. 842-849.

"Resource Auction Multiple Access (RAMA) for Statistical Multiplexing of Speech in Wireless PCS", IEEE Transactions on Vehicular Technology, vol. 43, No. 3, Aug., 1994 by Noach Amitay, pp. 584-596.

"Resource Auction Multiple Access (RAMA) in the Cellular Environment", IEEE Transactions on Vehicular Technology, vol. 43, No. 4, Nov., 1994 by Noach Amitay, pp. 1101-1111.

*Primary Examiner*—Dang Ton
*Attorney, Agent, or Firm*—John A. Caccuro; Henry T. Brendzel

[57] ABSTRACT

A wireless Local Area Network (LAN) includes a repeater which a) synchronizes interface adapters for portable end-user devices and b) retransmits data signals received which retimes and retransmits data signals received from these end-user devices that gain, one at a time, the exclusive right to transmit those signals during a given transmission time subframe by contending for access to the LAN resources that are auctioned off to permit LAN resource utilization that is independent of traffic load and that is implemented in a near collision-free environment.

16 Claims, 6 Drawing Sheets

5,684,801

PORTABLE WIRELESS LOCAL AREA NETWORK

TECHNICAL FIELD

This invention relates to communications systems and, more particularly to a wireless local area network.

BACKGROUND OF THE INVENTION

Over the last few years, Wireless Local Area Networks (WLAN) have experienced unprecedented growth fueled by the popularity of portable computers and advances in wireless data communications. With the impending standardization of wireless access method and physical layer specifications for WLAN adapters, interface cards and hubs, WLAN-based products are poised for further growth. The popularity of WLANs products stems from their low installation cost and their ability to provide the same user interface ("look and feel") of traditional LAN products.

In their effort to speed up software development and to adapt existing applications to wireless LANs, designers of WLANs products duplicated traditional LAN capabilities and as such, unfortunately, afflicted WLAN products with the same limitations of those traditional LAN products. Those limitations include a) significant throughput degradation with slight increase in traffic due to excessive number of collisions which hinder network performance, and b) incompatibility with more efficient non-802.X physical layer protocols. Those limitations take particular significance when one considers a) the widespread use of traffic-intensive bitmapbased applications and b) increased popularity of non-802.X protocols, such as the Asynchronous Transfer Mode (ATM) protocols. Another problem of the prior art is that the relatively high cost of WLAN products sometimes outweighs the flexibility benefits and installation cost advantage that WLAN products enjoy over their traditional counterpart. Thus, a problem of the prior art is lack of a cost-effective portable wireless LAN which limits the number of collisions to prevent throughput degradation.

SUMMARY OF THE INVENTION

The present invention is directed to a wireless LAN comprised of a repeater which a) synchronizes interface adapters for portable end-user devices and b) retransmits data signals received from these devices which gain, one at a time, the exclusive right to transmit those signals during a given transmission time subframe by contending for access to the LAN communications resources that are auctioned off to permit LAN resource utilization that is independent of traffic load and that is implemented in a collision-free environment.

DETAILED DESCRIPTION

Figure 1:
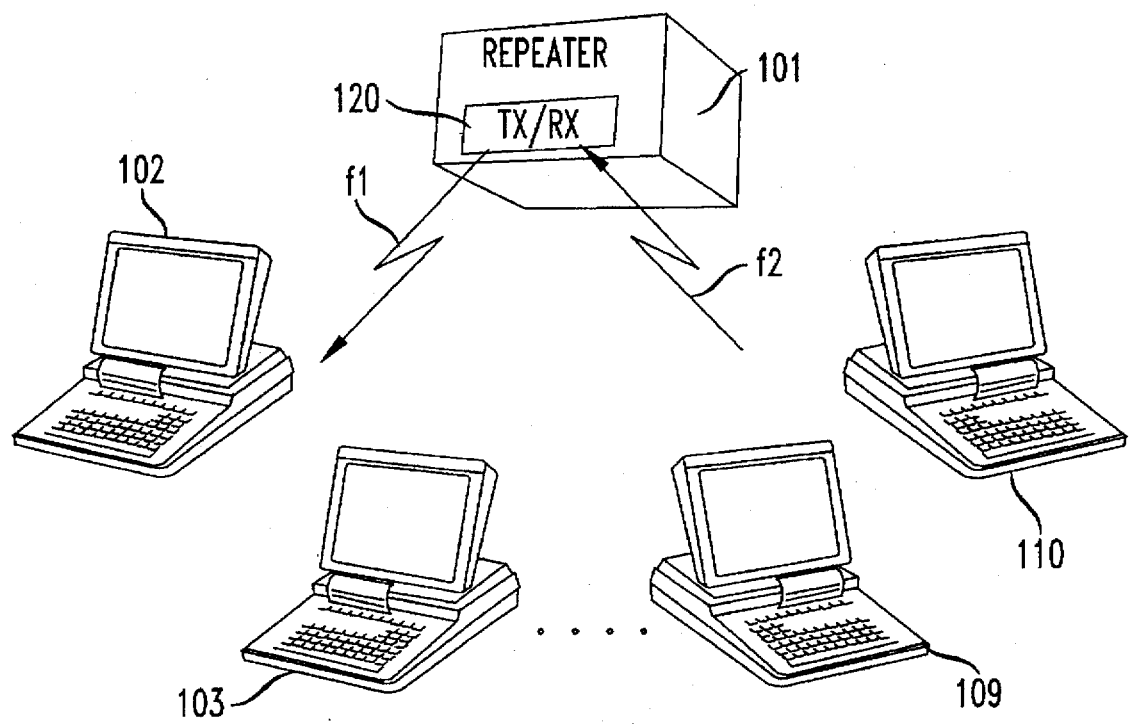
FIG. 1 illustrates in block diagram format a peer-to-peer wireless portable LAN arranged to implement the principles of the invention.

Shown in the block diagram of FIG. 1 is a wireless repeater 101 and portable end-user devices 102 to 110 which together form a Wireless Local Area Network (WLAN). Repeater 101 is arranged to synchronize interface adapters in the portable end-user devices 102 to 110, and broadcast data signals received from these devices to all active end-user devices on the WLAN of FIG. 1. Repeater 101 includes a transceiver (TX/RX) 120 which is arranged to a) detect modulated subcarrier signals emitted by the portable end-user devices and transmit those signals to portable end-user devices 102 to 110 in a collision-free environment, as explained further below. Of particular significance is the role of repeater 101 to provide a common timing basis for the portable end-user devices 102 to 110 that are active on the WLAN. Specifically, data exchanges between active portable end-user devices 102 to 110 and the repeater are broken down into a sequence of time slots on the shared medium which may be InfraRed (IR) or Radio Frequency (RF) in a given spectral range. During each time slot, a superframe is transmitted. The superframe is comprised of a) a superframe marker which is a header indicative of the beginning of the superframe b) one administrative frame that is used to promote orderly, fair and collision free access to the shared medium, and c) a communications frame which carries payload information. Time within each subframe is divided between an auction time (described below) followed by a packet (or cell) transmission/reception time. Packets transmitted within a communications frame can be formatted according to the Asynchronous Transfer Mode (ATM) standard. As is well known in the art, the ATM standard allows data to be formatted in 53-byte packets called "cells" for transmission to compatible devices.

When transceiver 120 of repeater 101 is IR-based, repeater 101 could be a ceiling mounted base unit that provides simultaneous uplink/downlink communications with $f_1$ and $f_2$ modulated subcarriers arranged to prevent signal interference between transmission and reception of IR signals. Because low-power infrared signals from IR-based repeater 101 are unable to penetrate walls, the range of IR wireless communications is limited to tens of feet. As a result, additional security benefits are provided by the IR-based repeater 101 because eavesdropping is impossible for other portable devices located outside the range of signals broadcast by IR-repeater 101. Advantageously, the wide availability and low cost of optoelectronic components (LEDs and photodiodes) used in IR transceivers allow an IR-based system to be cheaper than an equivalent Radio Frequency (RF) repeater. Because of the cost difference between IR-based and RF-based repeater 101 is preferably IR-based even though we recognize that an RF-based repeater is more suitable for applications where greater range is desirable or imperative.

Although a limited number of portable end-user devices is shown in FIG. 1 for illustrative purposes, it is to be understood that the WLAN of FIG. 1 can support communications between a much larger number of portable end-user devices. It is also to be understood that the functions of repeater 101 may be implemented in one of the portable end-user devices assuming that the portable end-user device is strategically located to allow a clear communications path between the portable end-user device (acting as a repeater) and the other active portable end-user devices.

Figure 2:
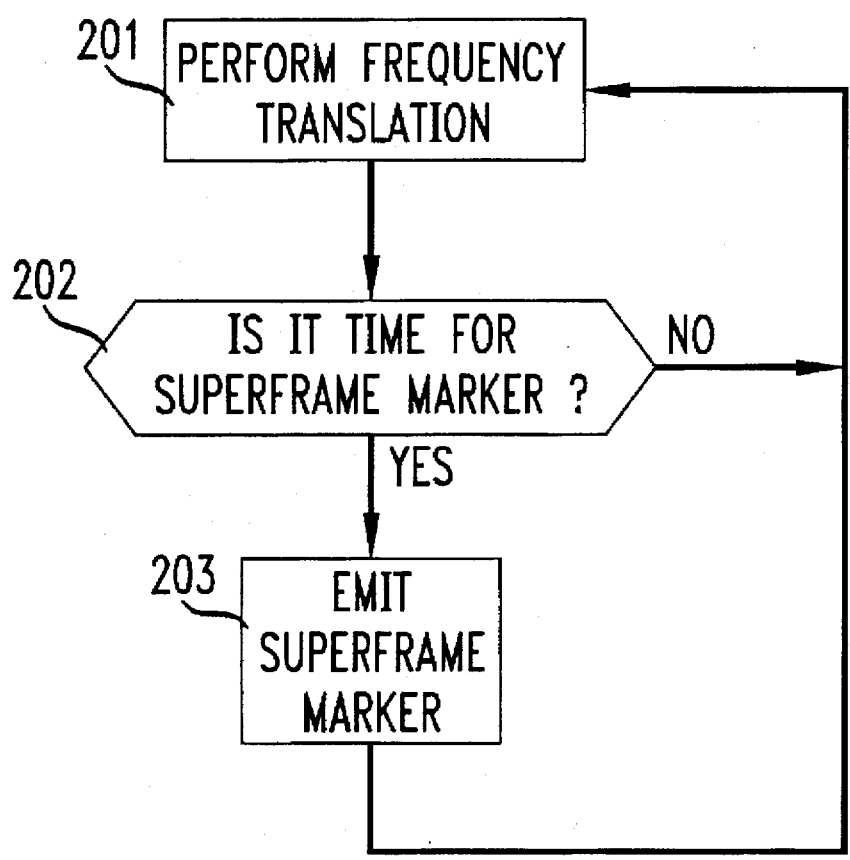
FIG. 2 shows some of the functions performed by the repeater of FIG. 1 to achieve orderly synchronization of the transmitting and receiving end-user devices exchanging data signals over the wireless LAN.

FIG. 2 shows some of the functions performed by the repeater of FIG. 1 to achieve orderly synchronization of data signals transmitted and received over the wireless WLAN. When repeater 101 receives wireless signals from one of the portable end-user devices 102 to 110, it performs a frequency translation, as indicated in step 201, by transmitting the received data signals at a carrier frequency that is different from the one at which those signals were received. The frequency translation function performed by repeater 101 prevents interference between data streams being transmitted and received simultaneously by repeater 101. As mentioned above, repeater 101 is arranged to announce the beginning of periodic predetermined time intervals hereinafter called "superframes" by generating a superframe marker. Thus, the frequency translation indicated in step 201 is performed until a timer expires, to indicate, for example, that it is time for repeater 101 to emit a superframe marker as shown in step 202. Accordingly, in step 203 repeater 101 generates and emits the superframe marker.

Figure 3:
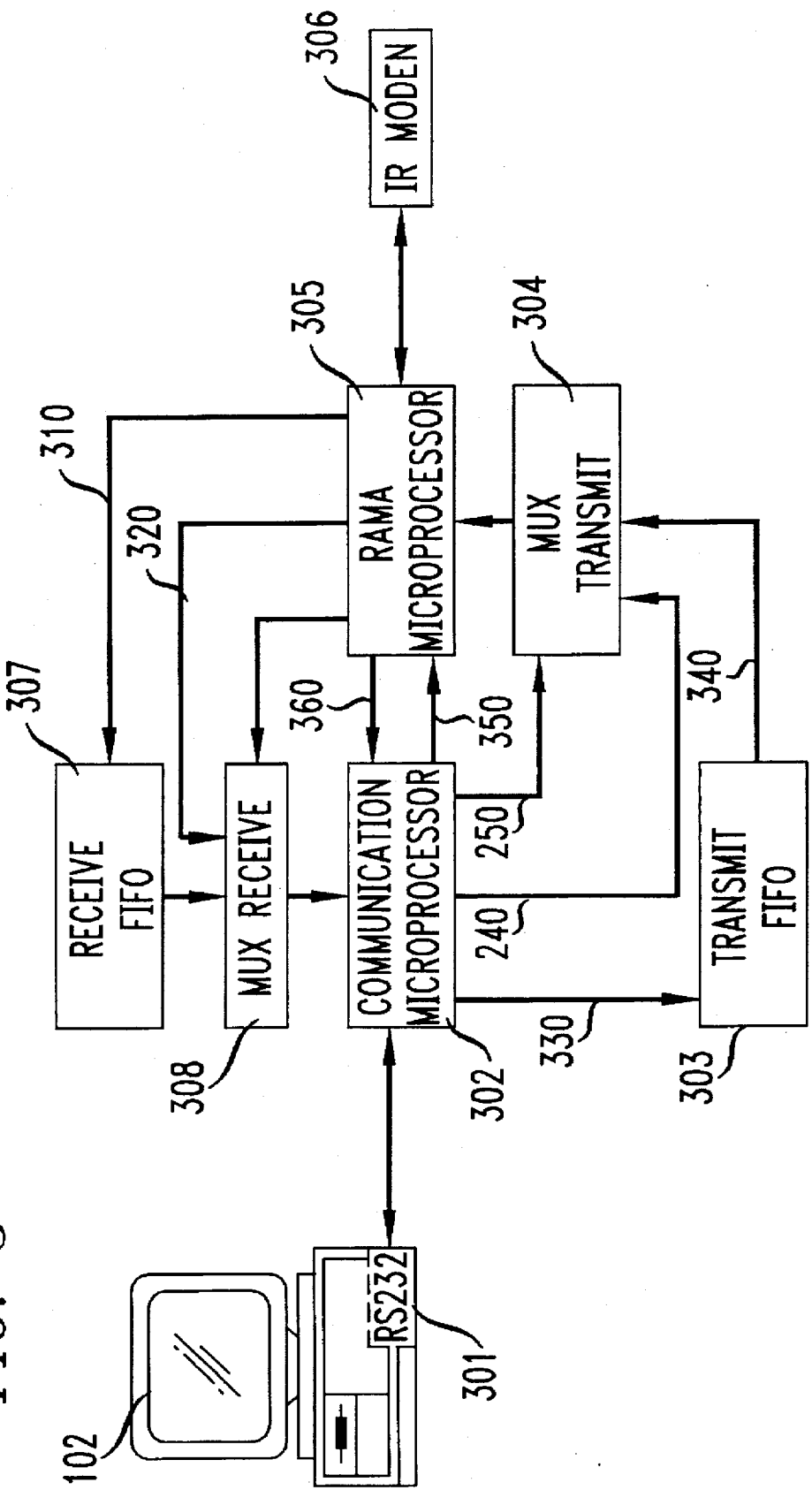
FIG. 3 shows some major components of an interface adapter that enables portable end-user devices equipped with such adapters to communicate with each other via a repeater.

FIG. 3 shows some major components of an interface adapter that enables portable end-user devices equipped with such adapters to communicate with each other via repeater 101 of FIG. 1. The interface adapter of FIG. 3 includes a communications microprocessor 302, a Resource Auction Multiple Access (RAMA) microprocessor 305, an IR (or radio) modem 306, a transmitter multiplexer 304, a receiver multiplexer 308, a transmit packet FIFO 303 and a receive packet FIFO 307. Communications microprocessor 302 is the point of access (egress) to the wireless WLAN of FIG. 1 for all data signals entering (leaving) a portable end-user device, such as device 102, for example. Data leave and enter portable device 102 via a bus connected to a physical interface of (portable end-user device 102) which may be a serial port, such as the RS-232C port 301. Alternatively, the physical interface may be a Personal Computer Memory Card International Association (PCMCIA) card.

Communications microprocessor 302 includes a buffer memory (not shown) which stores a list of identification numbers for all active portable end-user devices on the WLAN of FIG. 1. Each interface adapter has a unique Permanent IDentification number (PID) which may be, for example, the physical address of the interface adapter. To insure its uniqueness, the PID may be at a few bytes long. Communications microprocessor 302 is also arranged to generate at least one number—typically a single byte—in response to a command from RAMA microprocessor 305. This number is typically a temporary identification number (TID) which may be selected from either a large number of values based on a random process, or from a smaller set of numerical values in a deterministic fashion. Since each payload data packet is preceded by a RAMA contention time interval, the TID (as opposed to the PID) is used for that purpose because it has less bytes and therefore, allows more payload information to be carried in the subsequent packet.

When a portable device is active, the TID/PID pair associated with the interface adapter of the device is known by all the other active devices on the WLAN as explained in further detail below. Communication microprocessor 302 is connected to multiplexer 304 via a bus 240 and a control line 250 which selects the state of multiplexer 304. Control line 250 sets multiplexer 304 to a particular one of two states to permit information from bus 240 to be passed to microprocessor 305. In the alternate state (dictated by control line 240), multiplexer 304 allows information from FIFO 303 to be transferred to RAMA microprocessor 305 via bus 340. Similarly, control line 380 dictates the state of multiplexer 308. In one of two states of multiplexer 308, control line 380 allows information from microprocessor 305 to be received by microprocessor 302 via bus 320. In the alternate state of multiplexer 308, control line 380 permits information from First-In, First-Out buffer (FIFO) 307 to reach microprocessor 302. FIFO buffers 307 and 303 are both used to allow asynchronous transfer of data between the microprocessors 302 and 305. Additionally, the storage capacity of FIFO 303 and 307 prevent overflow of data exchanged between microprocessors 302 and 305 and end-user device 302, thereby, implementing a pipelining process for exchange of data between the two microprocessors and the end-user devices. Control pins 350 and 360 are used to alert microprocessors 305 and 302, respectively, that data signals being received from the other microprocessor via multiplexor 304 or 308 are received directly from the transmitting microprocessor, rather than from FIFO 303 or 307.

When the WLAN of FIG. 1 uses the ATM standard for data communications, microprocessors 302 and 305 may include the AT&T Microelectronics T7652 ATM chip which implements ATM Layer functions such as formatting data into 53-byte cell, policing and virtual channel translation as defined in the evolving ATM standards. Advantageously, the use of an ATM chip allows the WLAN of FIG. 1 to offer higher layer protocols services, such as different grade-of-service (GOS) for different portable end-user devices.

Infrared modem 306 modulates and demodulates infrared subcarrier signals received and transmitted to repeater 101. In an illustrative implementation of IR modem 306, Frequency Shift Key (FSK) modulation and demodulation techniques are used to modulate and demodulate the subcarrier signals received from, and transmitted by repeater 101. IR modem 306 includes a physical interface comprised of four pins (not shown). One of the pins provides the amplitude shift key of the transmitted signal. A second of those pins provides the frequency shift keyed signal while a third one of the pins is the received amplitude shift key data and the fourth pin is the frequency shift key data. The two amplitude shift keyed pins are used during the RAMA auction. It is to be understood that infrared modem 306 can be implemented as a Radio Frequency (RF) modem when repeater 101 broadcasts RF signals to portable end-user devices 102 to 110.

Figure 5:
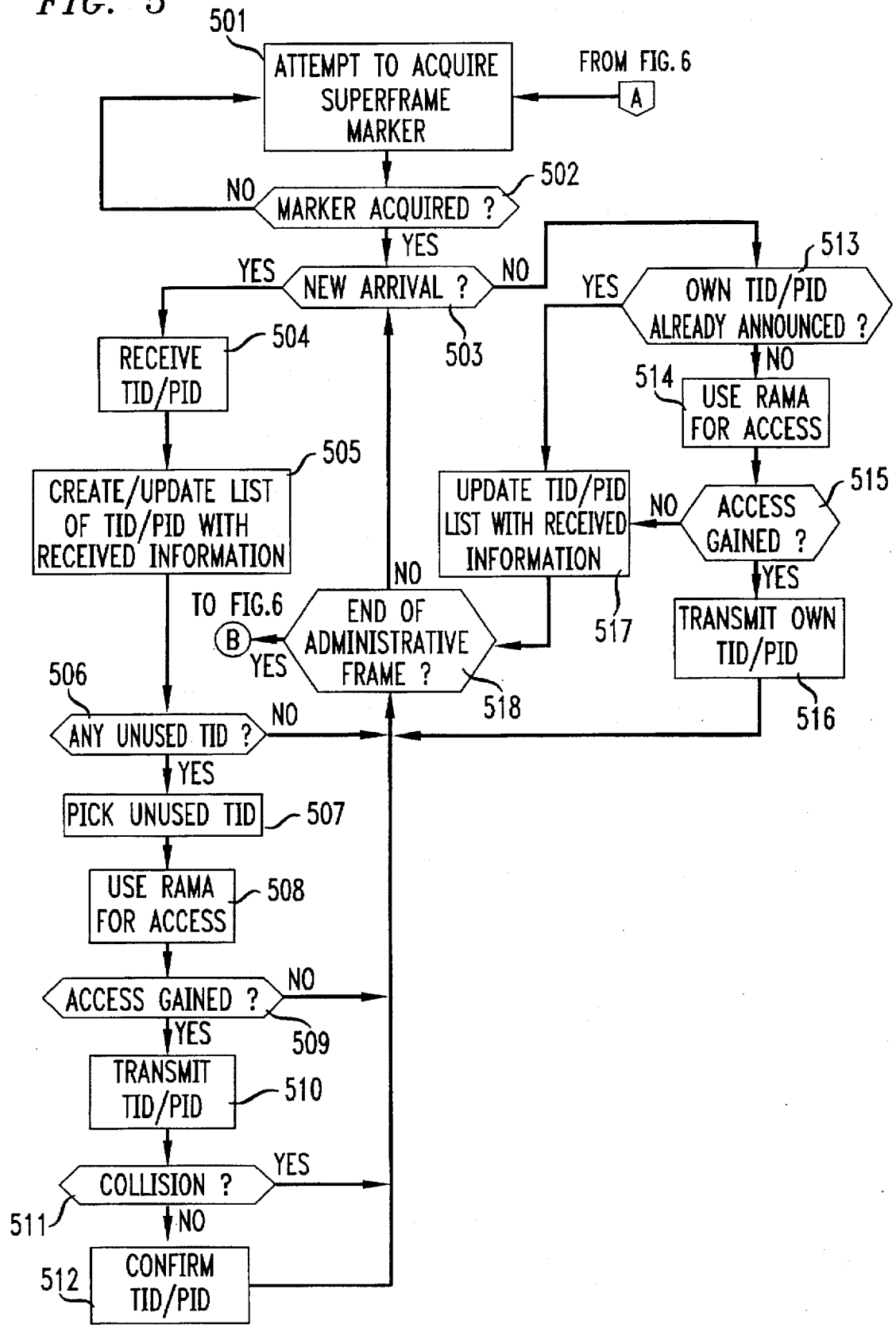
FIG. 5 is a flow chart describing how portable devices get access to the shared medium.

RAMA microprocessor 305 includes an EEPROM (not shown) which stores different programmed instructions executed by a CPU of microprocessor 305. Programmed instructions stored in, and executed by RAMA microprocessor 305 include superframe marker acquisition, WLAN access instructions, contention resolution instructions and communications function instructions for exchange of data between microprocessors 302 and 305 (described above). Illustrative programmed instructions for WLAN access and superframe marker acquisition are shown in FIG. 5 and described below.

Figure 4:
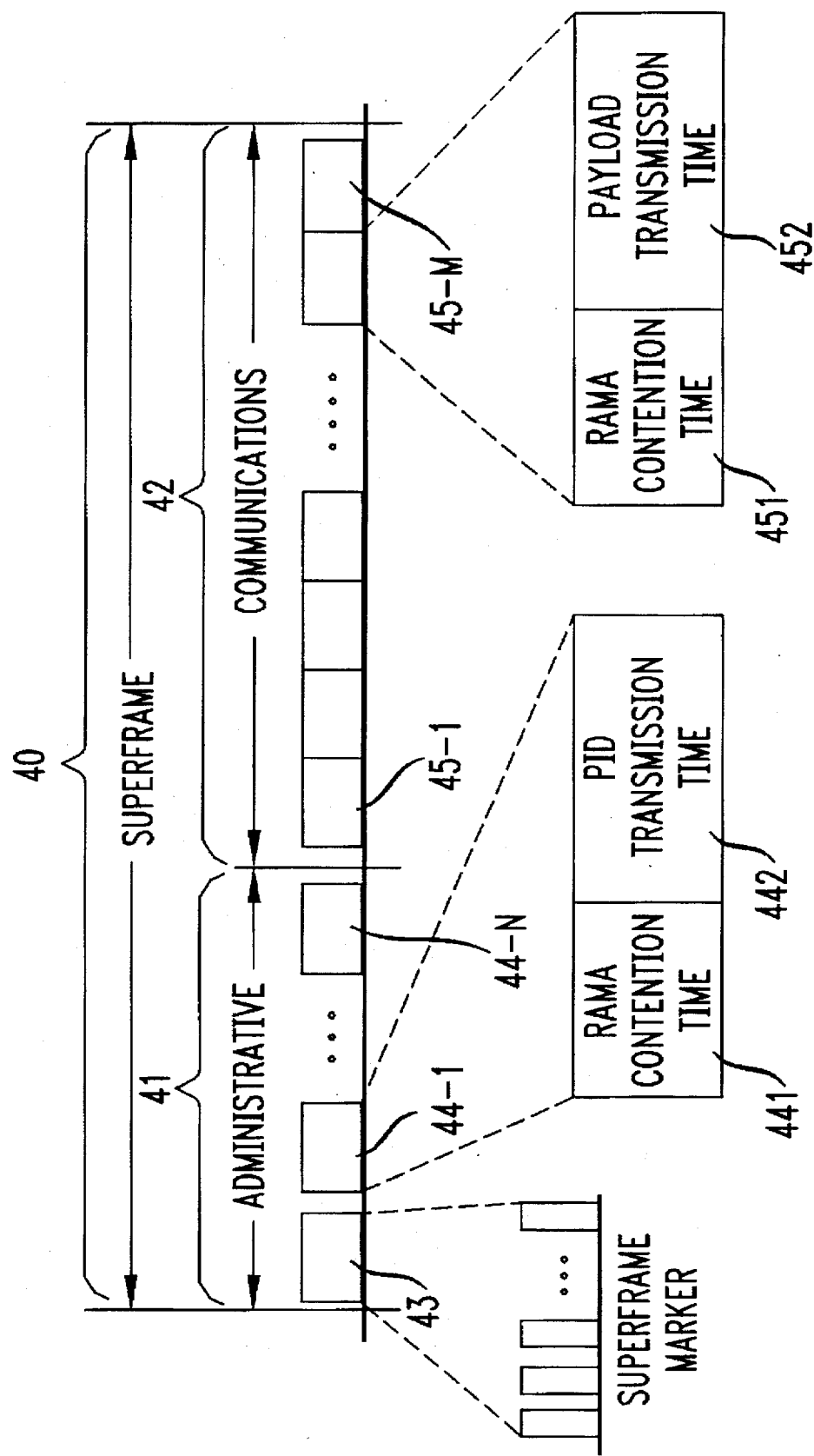
FIG. 4 shows the layout of the different elements of a superframe transmitted during each time slot on the LAN of FIG. 1.

The contention resolution instructions allow active portable end-user devices that have one or more packets to transmit to contend for access to the shared medium of the WLAN of FIG. 1 by entering an auction for resources on the medium. In order to facilitate a better understanding of the auction process, it might be helpful to discuss some of the elements of a superframe depicted in FIG. 4. As shown in FIG. 4, superframe 40 is divided into an administrative frame 41 and communications frame 42. The administrative frame 41 includes a header called a superframe marker 43 which alerts all end-user devices of the beginning of a new administrative frame and superframe. The administrative frame also includes a plurality of administrative subframes 44-1 to 44-N. Each of these subframes includes a RAMA contention time 441 and a Permanent IDentification (PID) transmission time 442. During the RAMA contention time 441, the TIDs are used in an auction. The winner of that auction gains the privilege of transmitting its PID and, thus, announcing itself to the other active devices on the LAN. The communications frame 42 includes a plurality of communications subframes 45-1 to 45-M. Each one of these subframes is comprised of a RAMA contention time 451 and payload transmission time 452. During the RAMA contention time 451, those active devices on the LAN who wish to transmit information, participate in an auction using their TIDs. The unique winner of this auction, gains the privilege of transmitting its data packet during the payload time 452.

Portable end-user devices contending for the WLAN resources enter the auction by simultaneously transmitting, at a prescribed time, their respective contention code, e.g., TID (that has a predetermined number of digits), one digit at a time. In each TID, the most significant digit is transmitted first. Following the transmission of that digit TID by all contending portable end-user devices, each device, upon receiving the digits (from all other devices compare the received digits to their own most significant digits (MSD) in their own TID. Portable end-user devices with lesser value in their MSD than the highest value received drop out of contention. These losing portable end-user devices reenter the auction for the next resource in the following administrative or communications subframe. The next significant digit of each TID is then transmitted and the received digits are then compared to allow more losing portable end-user devices to drop out of the auction. The process continues until all digits have been auctioned and a unique (single) portable end-user device is a winner which then has exclusive rights to broadcast its packet on the administrative or communications subframe. In accordance with conventional practice, the digits in the TID are formed by a string of bits that are transmitted one bit at a time. Hence, comparison of most significant bits during successive rounds of the auction can also be implemented, even though the overall auction process will last longer before a winner is determined. During the communication frame this procedure is repeated for the remaining resources until either all requests for data broadcasting are satisfied or no communications resources are unavailable.

The successive auction rounds produce a single winner for each unused resource while weeding out the rest of the contending portable end-user devices. Advantageously, this procedure allows unused time slots to be always assigned irrespective of the traffic demand while permitting losing portable end-user devices to gracefully back off, thereby preventing collision on the WLAN medium.

FIG. 5 is a flow chart describing how portable end-user devices get access to the shared medium of the portable wireless WLAN of FIG. 1. The process for a portable end-user device to access the shared medium of the WLAN of FIG. 1 is initiated in step 501 when a portable end-user device, (let us select for example portable end-user device 103) attempts to acquire that superframe marker. Typically, performance of this step involves waiting for a superframe maker to be emitted by repeater 101. The waiting for the marker and the attempt to acquire such marker continues until the superframe marker is acquired by portable end-user device 103, as indicated in step 502. This acquisition marks the start of the administrative frame. A determination is then made, in step 503, as to whether portable end-user device 103 is a new device trying to access the WLAN. If so, portable end-user device 103 waits for a broadcast from repeater 101 informing all active portable end-user devices of the TID/PID of the specific, portable end-user device that won the auction, and therefore, the right to broadcast its TID/PID during the transmission cycle for that administrative subframe. This TID/PID information is received in step 504 by portable end-user device 103 which uses that information to build/update and store in communications microprocessor 302 a list of TID/PID for all active portable end-user devices on the WLAN of FIG. 1, as indicated in step 505. A determination is then made in step 506, as to whether portable end-user device 103 can assign itself an heretofore unused TID. If so, portable end-user device 103 picks the unused TID in step 507, and enters the auction for the next administrative subframe, as shown in step 508. If access to the WLAN of FIG. 1 is gained by portable end-user device 103, as determined in step 509, portable end-user device transmits its TID/PID in step 510, to announce its address to the other active portable end-user devices on the WLAN. A determination is then made as to whether a collision has occurred in the transmission of the TID/PID pair by portable end-user device 103. This may occur, for example when another newly arriving portable end-user device selects the identical "unused" TID picked by end-user device 103. Accordingly, when portable end-user device 103 receives a TID/PID with its TID but a different PID, it infers that there is one or more simultaneous new arriving portable end-user device with the same TID. In that case, steps 503 to 510 are repeated until portable end-user device 103 can ascertain that its picked TID is unique on the WLAN. Then, in step 512, portable end-user device transmits a confirmation of no conflict to all other portable end-user devices on the WLAN in order to instruct them to enter its TID/PID pair on their list of active portable end-user devices.

If in step 506, portable end-user device 103 is unable to ascertain (as of yet) whether there are any unused TID that it can assign to itself, portable end-user device 103 then determines in step 518, whether the cycle for the administrative frame has ended. If so, portable end-user device 103 has to wait until the beginning of the administrative frame of the next superframe to start the process described in FIG. 5. If the transmission cycle for the administrative frame has not ended, steps 503 to 507 are repeated until portable end-user device 103 can select an unused TID. Similarly, when portable end-user device 103 is unable to win the RAMA auction in step 509, portable end-user device 103 determines in step 518 whether the transmission cycle for the administrative frame has ended. If not, steps 503 to 509 are repeated until portable end-user device wins the RAMA auction. If portable end-user device 103 is not a newly arriving portable end-user device on the WLAN, as determined in step 503, portable end-user device 103 then in step 513 determines whether it has already announced its TID/PID pair to the other active portable end-user devices on the WLAN. If not, portable end-user device 103 enters the RAMA auction in step 514 to gain the right to broadcast its TID/PID pair. Upon winning the auction, as determined in step 515, portable end-user device transmits its TID/PID pair to repeater 101 which, in turn broadcasts that TID/PID pair to all active devices on the WLAN, as indicated in step 516. If portable end-user device 103 does not win the RAMA auction, it listens to the broadcast of repeater 101 to update its list of TID/PID of active devices on the WLAN, as indicated in step 517. Steps 503,513, 514, 515, 516 and 517 are repeated until the end of the transmission cycle for the administrative frame, as determined in step 418.

Figure 6:
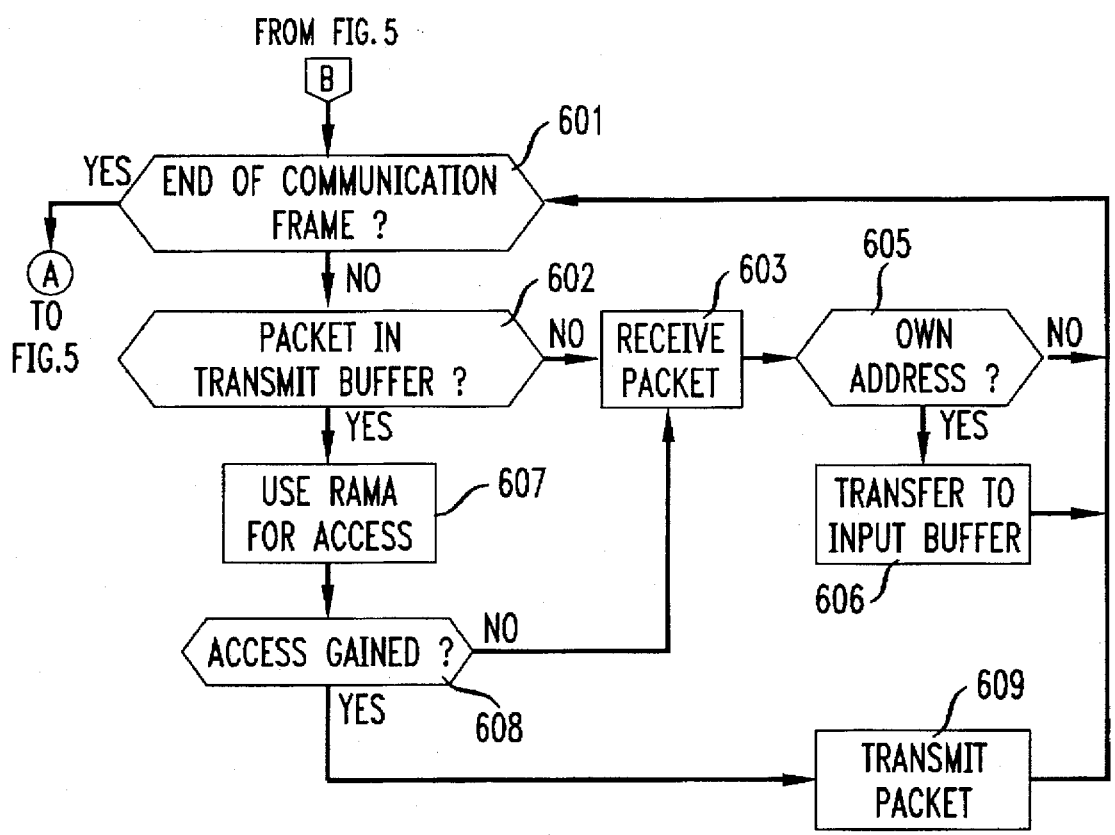
FIG. 6 shows in flow diagram format the steps needed for data to be transmitted and received by the portable devices and the repeater of the wireless LAN in accordance with the invention.

FIG. 6 shows in flow diagram format the steps needed for payload data to be transmitted and received by the portable end-user devices and the repeater of the wireless WLAN of FIG. 1. The process for transmitting and receiving payload data on the WLAN of FIG. 1 is initiated in step 601 when an active portable end-user device, such as device 110, for example, determines that the communications frame is still in progress. Then in step 602, portable end-user device 110 determines whether it has any data packet(s) to transmit to repeater 101. If so, portable end-user device 110 enters the RAMA auction in step 607 to gain exclusive access to the following data time slot. If portable end-user device 110 wins the RAMA auction, as determined in step 608, it transmits its data packet in step 609 and repeats the process of FIG. 6 until the end of the communications frame. When portable end-user device 110 has no data to transmit, as determined in step 602, portable end-user device 110 listens to the broadcast of repeater 101 to receive data packets transmitted by the other portable end-user devices, as shown in step 603. The header of a received packet is analyzed in step 605 to determine whether the transmitted data packet was intended for portable end-user device 110. If so portable end-user device 110 transfers the received data packet to its input buffer. If the data packet is addressed to other end-user devices, portable end-user device 110 discards the received data packet and continues the process described in FIG. 6 until the communication frame ends.

The foregoing is to be construed as only being an illustrative embodiment of this invention. Persons skilled in the art can easily conceive of alternative arrangements providing functionality similar to this embodiment without any deviation from the fundamental principles or the scope of this invention.

We claim:

1. A wireless local area network for exchanging data between a plurality of end-user devices, comprising
    a plurality of adapters each one of said adapters being coupled to respective one of said end-user devices, and being arranged such that in response to a request from more than one of said end-user devices for resources of said local area network, said adapters cooperate to allocate said resources to a particular one of said end-user-devices only when said particular one of said end-user devices is a sole winner of an auction among said more than one of said end-user devices requesting access to said resources; and a repeater which receives data signals from said particular one of said end-user devices which won said auction and which broadcasts said received data signals to said end-user devices.

2. The invention of claim 1 wherein said repeater includes:
    a transceiver which transmits said received data signals at a different frequency from which said signals were received.

3. The invention of claim 1 further including
    respective processors which are included in said adapters and which perform successive comparisons of most significant bits in addresses associated with each one of said end-user devices during successive rounds of said auction until said sole winner is selected.

4. The invention of claim 1 wherein at least two of said end-user devices communicate their respective address in order to participate in said auction.

5. The invention of claim 1 further including
    respective processors which are included in said adapters and which perform successive comparisons of most significant digits in codes associated with each one of said end-user devices during successive rounds of said auction until said sole winner is selected.

6. The invention of claim 1 wherein said repeater
    defines time intervals within which said auction for said resources can be held.

7. The invention of claim 1 wherein said repeater
    provides timing signals for said end-user devices.

8. A method of operating a wireless local area network for exchanging data between a plurality of end-user devices, said method comprising the steps of:
    receiving from more than one of said end-user devices a request to access resources of said wireless local area network;
    in response to said request, granting said access to said resources of said wireless local area network only when a particular one of said more than one end-user devices is a sole winner of an auction among said more than one end-user devices contending for said access to said wireless local area network resources; and
    broadcasting from a repeater data signals received from said particular one of said end-user devices to said plurality of end-user devices.

9. The invention of claim 8 wherein said broadcasting step includes the step of:
    transmitting said received data signals at a different frequency from which said signals were received.

10. The invention of claim 8 wherein said granting step includes the step of:
    performing successive comparisons of most significant bits in respective addresses associated with each one of said end-user devices during successive rounds of said auction until said sole winner is selected.

11. The invention of claim 8 further comprising the step of:
    communicating an address by each end-user device in order to participate in said auction.

12. The invention of claim 8 wherein said granting step includes the step of:
    performing successive comparisons of most significant digits in codes associated with each one of said end-user devices during successive rounds of said auction until said sole winner is selected.

13. The invention of claim 8 further comprising the step of:
    defining time intervals within which said auction for said resources can be held.

14. The invention of claim 1 wherein said broadcasting step further includes the step of:
    providing timing signals for said received data signals.

15. A wireless local area network for exchanging data between a plurality of end-user devices, said local area network comprising:
    means for receiving from said end-user devices requests for access to said local area network;
    means for defining transmission cycles for exchange of data on said local area network;
    means for assigning a unique address to each of the end-user devices requesting access to said local area network for use of resources of said local area network; and
    means within each of the end-user devices for collectively allocating access to said local area network to a particular one of said end-user devices requesting use of the resources of said local area network within said transmission cycle only when the particular one of said end-user devices is a sole winner of an auction for said access to said local area network, wherein at least one other end-user device to which a unique address has been assigned competes for said access to said local area network in said auction.

16. A wireless local area network for exchanging data between a plurality of end-user devices, comprising a repeater which receives data signals from a particular one of said end-user devices and which broadcasts said received data signals to the other end-user devices;

a plurality of adapters which are arranged to a) couple respective ones of said end-user devices to said local area network and b) allocate resources of said local area network to a particular one of said end-user devices in response to receiving from more than one of said end-user devices a request to access said resources of said local area network, said resources being allocated to said particular one of said end-user devices only when said particular one of said end-user devices is a sole winner of an auction among said more than one end-user devices which contend for access to said resources, said allocation of resources allowing data to be received from said particular one of said end-user devices by said repeater for broadcasting to said plurality of end-user devices.

* * * * *